Figure 11:
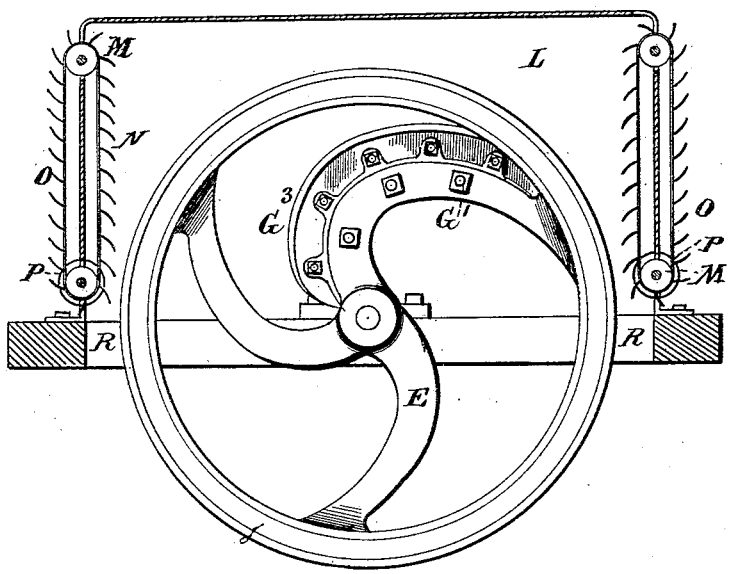

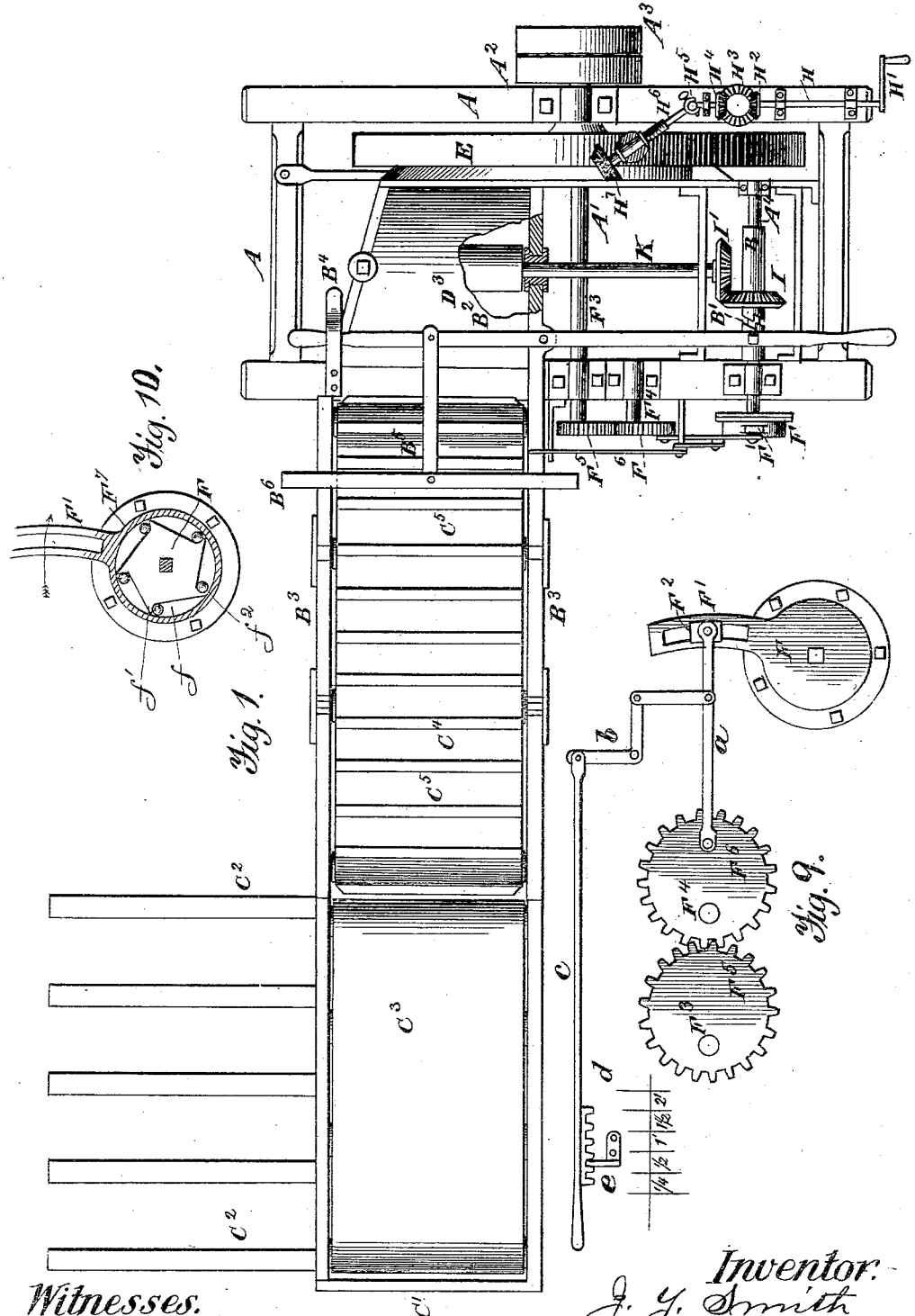

(No Model.) 3 Sheets—Sheet 2.
J. Y. SMITH.
ENSILAGE CUTTER.
No. 311,538. Patented Feb. 3, 1885.
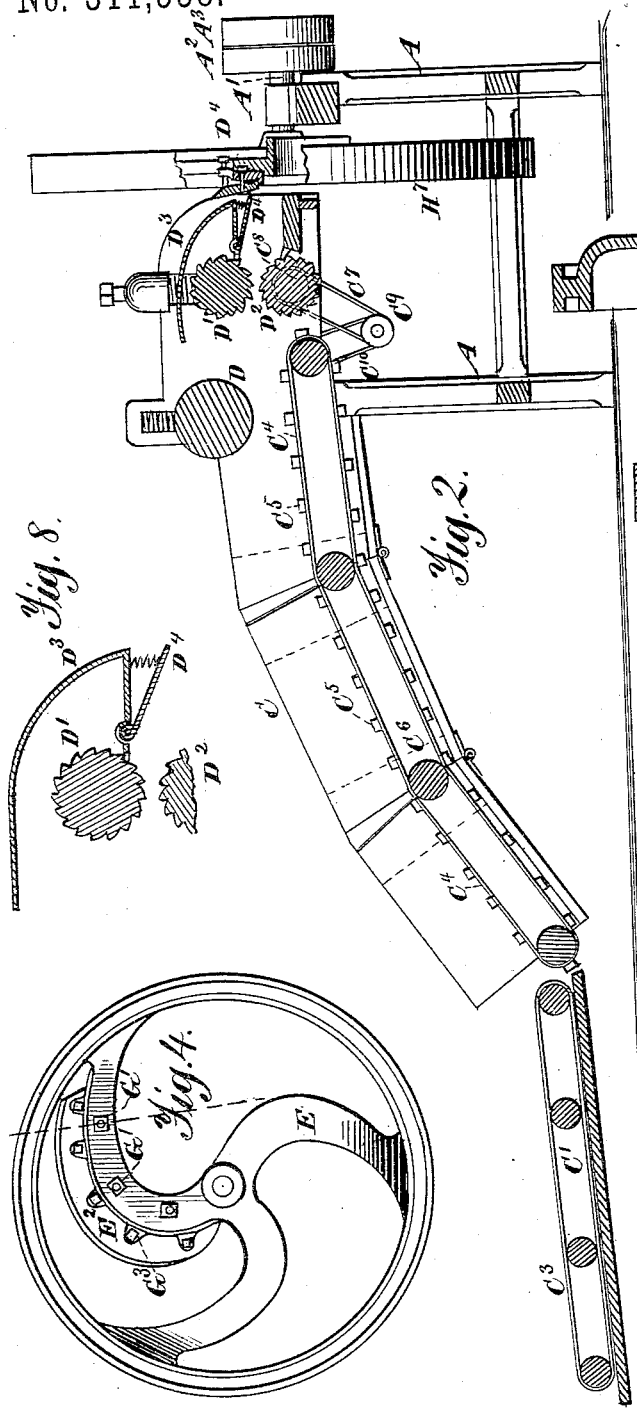
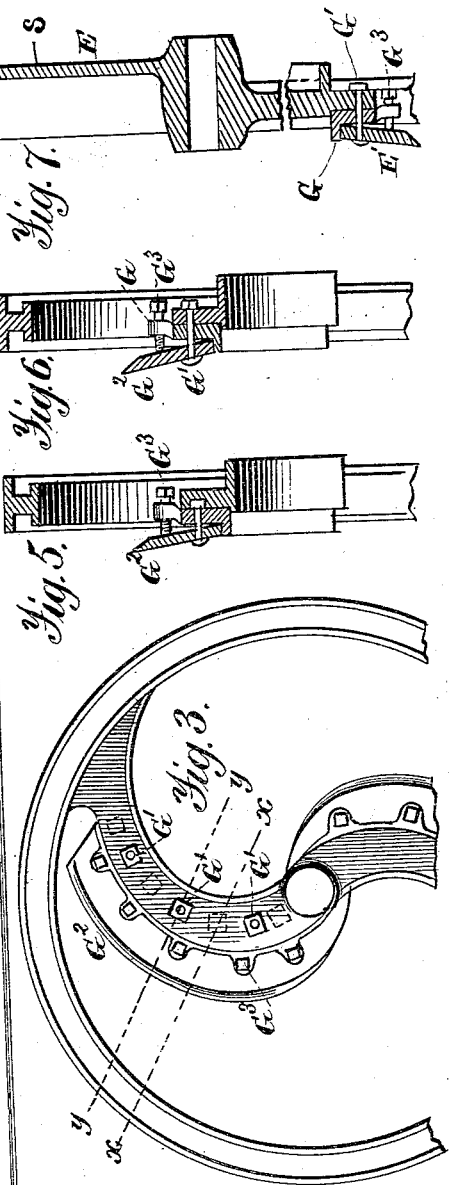
Witnesses.
A. Ruppert.
H. J. England.
Inventor.
J. Y. Smith
Holloway & Blanchard
Att'ys (No Model.) 3 Sheets—Sheet 3.

J. Y. SMITH.
ENSILAGE CUTTER.

No. 311,538. Patented Feb. 3, 1885.

Witnesses.
A. Ruppert.
J W Garner

Inventor:
John Y. Smith,
per Holloway & Blanchard
Attys

UNITED STATES PATENT OFFICE.

JOHN Y. SMITH, OF DOYLESTOWN, PENNSYLVANIA.

ENSILAGE-CUTTER.

SPECIFICATION forming part of Letters Patent No. 311,538, dated February 3, 1885.

Application filed April 6, 1883. (No model.)

*To all whom it may concern:*

Be it known that I, JOHN Y. SMITH, a citizen of the United States, residing at Doylestown, in the county of Bucks and State of Pennsylvania, have invented certain new and useful Improvements in Ensilage-Cutters, of which the following is a specification, reference being had therein to the accompanying drawings.

My invention relates to machines for cutting cornstalks, grass, grain, and other similar substances, designed, principally, for use in cutting ensilage to be packed in silos; and the objects of my improvements are, first, to provide a novel means for securing the cutting-knives to the arms of a fly or balance wheel in such a manner that they may be readily removed and replaced when it becomes necessary for any cause; second, to provide a flexible or jointed conveyer for carrying the material to the cutting-box, which shall be capable of conveying it at different degrees of inclination, and thus adapt the machine to the raising of the material to different heights; third, to provide a novel form of fly-wheel and feeding mechanism by which the material may be cut of greater length than can be done with the mechanism now in use; fourth, to provide mechanism for varying the length of the pieces cut; and, fifth, to provide certain combinations of novel features, as will be more fully explained hereinafter.

In the accompanying drawings, Figure 1 is a plan view of an ensilage-cutting machine provided with my improvements. Fig. 2 is a sectional view showing an elevator for material, feeding-rollers, fly-wheel, and other details. Fig. 3 is a detail view of fly or balance wheel provided with cutting-knives. Fig. 4 represents one form of fly-wheel, the same having one knife only. Fig. 5 is a section taken on line $x\,x$ of Fig. 3, showing the manner of attaching the knives to a plate by which they are secured to the wheel. Fig. 6 is a section taken on line $y\,y$ of Fig. 3, showing the manner of attaching the knives to the arm of the fly-wheel. Fig. 7 shows in section a modification in construction of fly-wheel. Fig. 8 is a section illustrating the feeding-rollers and other details. Fig. 9 is a side view illustrating certain parts of the feeding mechanism. Fig. 10 shows in section a disk-wheel with curved arm, which is employed in the feeding mechanism. Fig. 11 is a partial front elevation of my ensilage-cutter, showing a means for preventing the material from binding or clogging between the rim of the fly-wheel and its inclosing-case.

A designates a suitable frame, upon which is mounted the shaft carrying the fly-wheel, the cutting-box, the feed-rollers, and the other parts which it is necessary to attach thereto.

In bearings mounted upon the frame A there is placed a shaft, A', to the outer end of which pulleys $A^2\,A^3$ are applied, the former being fast thereon, while the latter is allowed to revolve freely. Upon the opposite end of shaft A' is an eccentric gear-wheel, $F^5$, which engages with another eccentric gear, $F^6$, on a short shaft or stud fixed to the frame.

On one end of a shaft, $A^4$, having bearings in the frame, is placed a wheel, F, which is provided with peripheral inclines or seats $f$, having abutments $f'$. A circular inclosing-case, $F^7$, is placed over the wheel F. Balls $f^2$ are placed in the spaces left between the case $F^7$ and the wheel F, as shown at Fig. 10. When the case is turned in the direction indicated by the arrow, the balls run up the inclines of the wheel until they bind between the surfaces of said inclines and the inner side of the case, and thus cause the wheel F to rotate with the case; but when the case is turned in the opposite direction the balls release their hold and allow the case an independent movement. From the case extends a curved slotted arm, F', in which there is placed a sliding block, $F^2$, pivotally connected by rod $a$ with eccentric gear $F^6$. The rod $a$ is connected by a link with a bell-crank, $b$, having a handle-rod, $c$, which is provided with notches at $d$ to connect with a stop, $e$, fixed to the frame. It will be seen that by means of the rod $c$, with stop $e$, and crank connected with rod $a$, the block $F^2$ may be adjusted in position in the slotted arm F' toward or from the disk-wheel F, thus regulating the feeding-stroke of said arm, which is longer or shorter, according to the position of the block.

I designates a bevel gear-wheel on a sleeve, B, fixed on shaft $A^4$, said wheel engaging with bevel-gear I' on feed-roller shaft K.

Upon one end of sleeve B is formed a portion of a clutch, said portion being firmly fixed to the shaft, while the other portion, B', of the clutch slides freely thereon, the object of which arrangement is to make provision for stopping the feeding mechanism in the event of the operator getting his hand or clothing caught and carried toward the knives.

The stopping of mechanism is effected by means of a lever, B², which is pivoted to the upper edge of the cutting-box B³, and extends across the same to the side where the operator stands while feeding it, at which point it passes under a spring, B⁴, which holds it in its adjusted position. Each end of this lever is provided with a handle, by which it may be operated to stop the feeding mechanism in the event of there being in the material any substance that if allowed to be carried forward would be likely to cause the breaking of the feed-rollers or of the knives. It also has attached to it at a point directly over the cutting-box a connecting-rod, B⁵, which unites it with a bar, B⁶, which extends across said box in contact with its upper surface, it being so arranged that should the operator get his hand or arm caught in the moving material the pressure thereof on the bar would cause the portions of the clutch to be separated, and the feeding-rollers would cease to move.

For carrying the material to be cut to the cutting-box, there is provided a flexible or jointed conveyer, C, which consists of several sections joined together at their ends, one of which is fixed to the cutting-box, as shown in Fig. 2, the outer section, C', of said conveyer being arranged to rest upon the ground or floor of the building in which the machine is used. This section C' is provided with fingers or bars C² C², which extend therefrom at right angles to the path of the ingoing material, so that by laying said material on said bars it can, by the use of a rake or other implement, be placed upon the endless apron C³, preparatory to its being carried forward to the cutting-box by the apron C⁴, the upper surface of which is provided with transverse slats C⁵. At each of the joints of the conveyer there is placed a roller, C⁶, which supports the apron. The apron is driven by a belt, C⁷, which passes over a pulley, C⁸, placed upon the shaft of one of the feeding-rollers. The belt extends therefrom to a pulley, C⁹, placed upon a stud secured to the frame of the machine, or to the cutting-box, from which there extends a belt, C¹⁰, to a pulley on the front roller of the apron. Sometimes, for reducing the speed, I use a worm and worm-wheel to drive the front and rear sections of the elevator.

By the arrangement of parts described, the material may be carried to the cutting-box at different degrees of angularity, and the machine may be conveniently placed and operated in rooms or places where there would not be room for it if a regular inclined plane were used. I prefer to use in machines of this type a pressing-roller, D, which is placed in bearings formed in the cutting-box, and has springs above its journals for the purpose of pressing the material down upon the apron under the roller, the effect of which is to facilitate the delivery of said material to the feeding-rollers upon a horizontal line without reference to the inclination of the section of the conveyer next to them.

The feeding-rollers above alluded to, and designated by the letters D' and D², having their bearings in the sides of the cutting-box, are driven by any suitable connection with the driving-shaft A'.

For directing the material to the cutting-knives, or preventing it from passing up between the pressing-roller D and the feeding-rollers, there is provided a hood, D³, to which there is hinged a swinging plate, D⁴, which is provided with a spring for pressing it down upon the material as it passes to the knives.

In making provision for cutting the material in longer lengths than can be done in machines as ordinarily constructed, there is provided a fly or balance wheel, E, having, by preference, three arms, two of which are of the form shown at $s$ in Fig. 7, the remaining arm projecting in a straight line from the hub, as seen in same figure, and to which the knife E' is attached in a manner hereinafter described.

It will be seen that owing to the construction of the wheel E and the fact that it carries but one knife, the material can be pushed further forward between the tines when it is cut without coming in contact with the spokes of the wheel, thus enabling the operator to cut the parts of the required lengths, limited only by the amount of offset in the arms of the wheel and the capacity of the feeding mechanism.

An important feature of my improvement consists in the manner of attaching the cutting-knives to the arms of the wheel, it consisting in first securing to said arm a plate of metal, G, by means of bolts G', which pass through the knives E' and are held in position by nuts, as shown in Fig. 6. The outer edge of the plate G is provided with a series of ears through which pass set-screws G³.

To the plate G the knives G² are bolted, as shown in Fig. 5, the bolts passing through said knives and plate only. By this arrangement the knives can be placed upon the wheel and properly adjusted with reference to the edge of the cutting-bar by means of the set-screws G³, and when it becomes necessary to remove them for the purpose of sharpening them, or for other reasons, it is only necessary to remove the bolts G'—say three in number—when the plate G and the knives G² can be removed and sharpened without detaching them from the plate G, and they can be replaced without requiring any readjustment of the set-screws.

It sometimes becomes necessary to sharpen the knives without removing them from the wheel, and to enable the operator to do this there is secured to the upper surface of the frame A a shaft, H, to the outer end of which a crank, H', is secured, while to its inner end there is fastened a beveled gear-wheel, $H^2$, which meshes into another similar wheel, $H^3$, carried on a stud placed in or upon the frame A, and which meshes into a wheel, $H^4$, on a short shaft having bearing on the frame and provided with a socket or universal joint, $H^5$, from which there extends a shaft, $H^6$, which is placed at such an angle to the shaft H as to cause its opposite end to approach the path in which the cutting-knives travel, so that an emery-wheel, $H^7$, placed on its end may come in contact with the beveled edges of the knives as they are brought around to the proper position for grinding, which is done by the operator turning the crank H' and holding the wheel in proper contact with said knives. The shaft $H^6$ is capable of being lengthened or shortened by means of a socket placed in it, so that as the wheel wears away it may be brought into contact with the knives.

In Fig. 11, L represents a case or box which is bolted on the upper side of the front end of the frame, and in which case the fly-wheel revolves. When in operation, the fly-wheel revolves at a velocity of about one thousand revolutions per minute, and the use of the case is necessary in order to prevent the wheel from throwing the cut material about.

In order to prevent the ensilage or other fodder from clogging and binding in between the rim of the fly-wheel and the sides of the inclosing-case, I provide a series of rollers, M, which are journaled in the case on opposite sides of the fly-wheel. Endless belts N are carried by these rollers, and from these belts project teeth O, the extremities of which come nearly in contact with the rim of the fly-wheel. Pulleys P are secured to the shafts of the lower of each series of rollers, and from these pulleys driving-belts are connected to similar pulleys that are secured either to the driving-shaft or to any other suitable operating-shaft. No means for connecting these pulleys to the driving-shaft are here shown, as any suitable means may be employed for that purpose. Openings R are left at the bottom of the case, between it and the rim of the fly-wheel, through which openings the cut ensilage is discharged by the operation of the toothed endless belts.

Having thus described my invention, I claim and desire to secure by Letters Patent—

1. The flexible conveyer C, formed of sections that are hinged together at their lower sides, in combination with the cutting-box of a feed-cutting machine, endless aprons or carriers located in said sections, and means for operating them, substantially as described.

2. A fly-wheel having arms E, plates G, that are bolted to said arms, cutting-knives $G^2$, that are bolted to said plates, and set-screws $G^3$, that extend through lugs formed on the plates G and bear against the cutting-knives for the purpose of adjusting them, substantially as described.

3. A fly-wheel having arms E, plates G, that are bolted to said arms, cutting-knives $G^2$, that are bolted to said plates, set-screws $G^3$, that extend through lugs formed on the plates G and bear against the cutting-knives for the purpose of adjusting them, and arms s, one or more, that are placed out of line with the arms E, for the purpose set forth, substantially as described.

4. The combination of the feeding-rollers of a feed-cutter, one of which has an extended shaft, a shaft, $A^4$, journaled at an angle thereto, gearing for connecting said shafts, means for connecting and disconnecting said gearing, an arm that is secured to the shaft $A^4$, and means for permitting an independent movement of said arm on said shaft in one direction, a driving-shaft having a gear-wheel eccentrically secured thereon, a gear-wheel that is eccentrically mounted and that meshes therewith, a rod for connecting said latter gear-wheel with the arm, means for adjusting the end of the rod that is pivoted to the arm in or out thereupon, and means for securing said rod in position when adjusted, for the purpose set forth, substantially as described.

5. The combination of the feeding-rollers of a feed-cutter, one of which has an extended shaft, a shaft $A^4$, journaled at an angle thereto, gearing for connecting said shafts, an arm that is secured to the shaft $A^4$, and means for permitting an independent movement of said arm on said shaft in one direction, a driving-shaft having a gear-wheel eccentrically secured thereon, a gear-wheel that is eccentrically mounted and that meshes therewith, a rod for connecting said latter gear-wheel with the arm, means for adjusting the end of the rod that is pivoted to the arm in or out thereupon, means for securing said rod in position when adjusted, clutch B' on shaft $A^4$, lever $B^2$, that is pivoted to the cutter-box, sliding bar $B^6$, and connecting-rod $B^5$, for connecting said bar to the lever, all combined and arranged to operate substantially as described.

6. The combination of the cutter-wheel, a case for inclosing it, and rollers located in said case, and endless belts driven by said rollers, for the purpose described, substantially as set forth.

7. The combination of the cutter-wheel, a case for inclosing it, rollers located in said case, and endless belts having projecting teeth that are driven by the rollers for the purpose of preventing the cut material from clogging between the rim of the wheel and its inclosing-case, substantially as described.

In testimony whereof I affix my signature in presence of two witnesses.

JOHN Y. SMITH.

Witnesses:
H. J. ENGLAND,
J. W. HAMILTON JOHNSON.